Aug. 13, 1946.  W. W. TAYLOR  2,405,721
DUMP TRUCK AND LATCH
Filed June 2, 1943  2 Sheets-Sheet 1
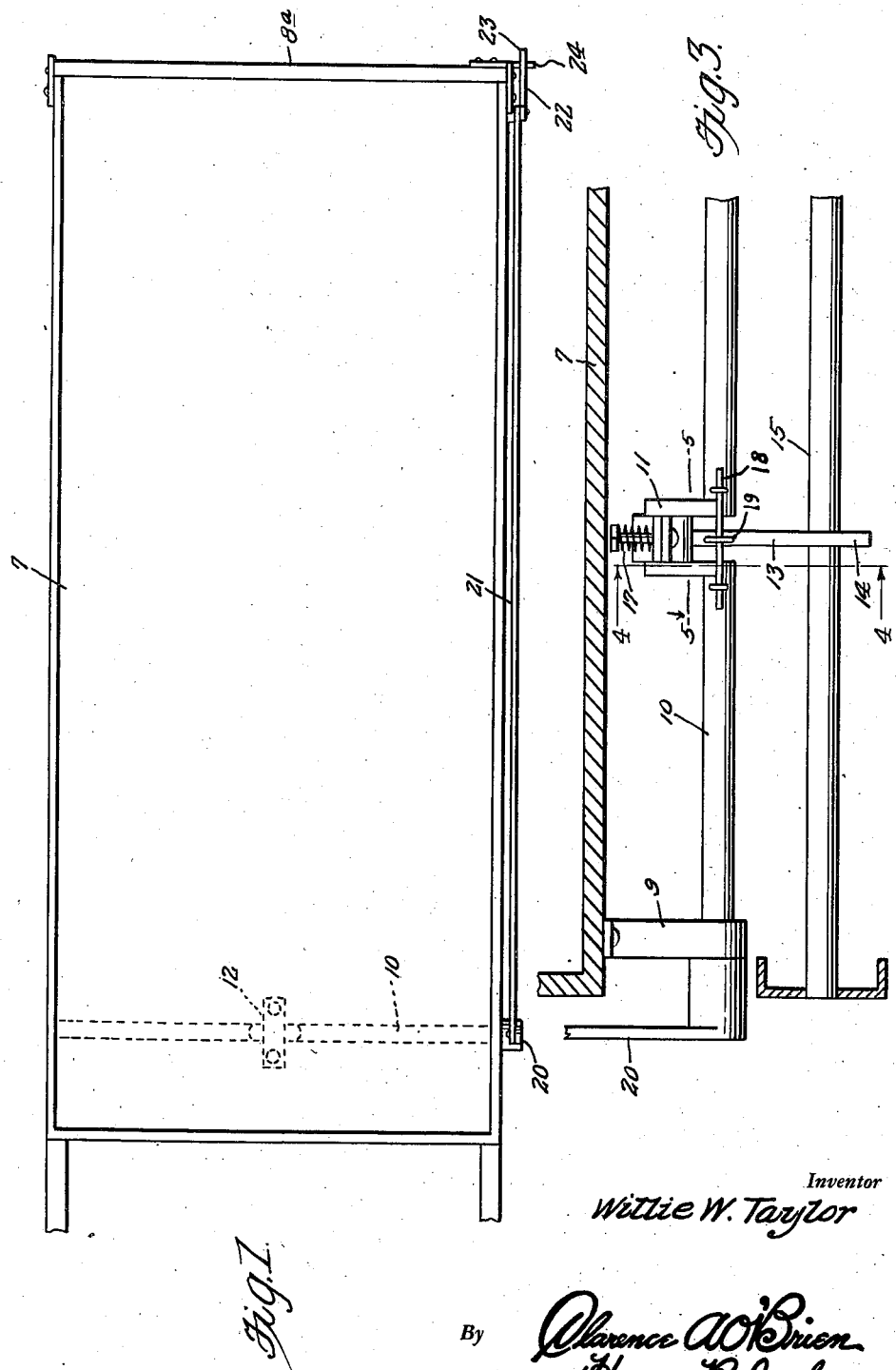

Aug. 13, 1946.  W. W. TAYLOR  2,405,721
DUMP TRUCK AND LATCH
Filed June 2, 1943  2 Sheets-Sheet 2
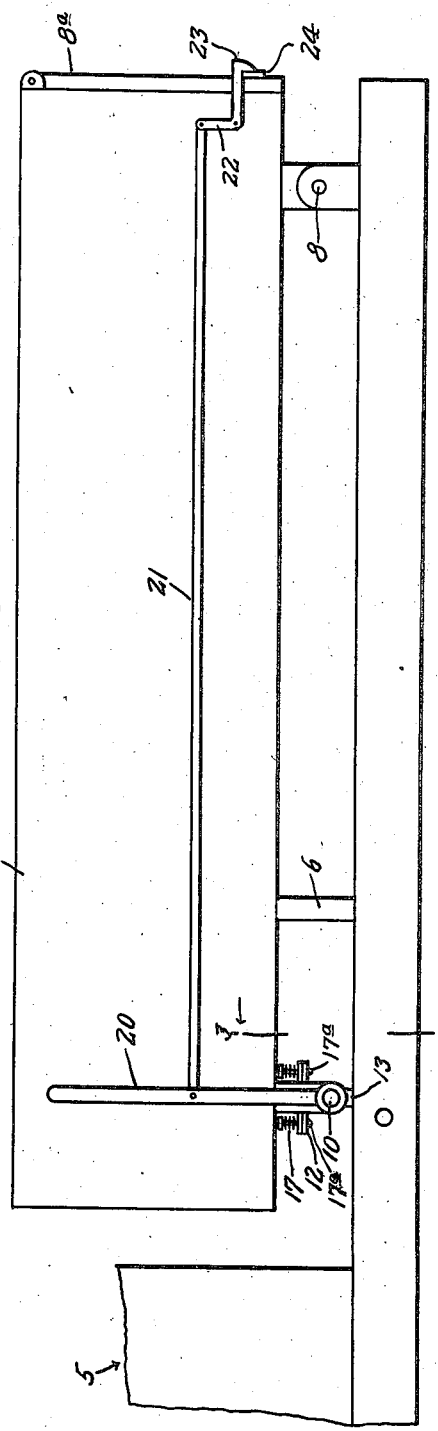
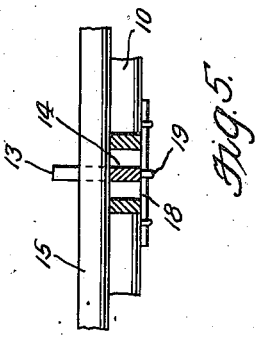
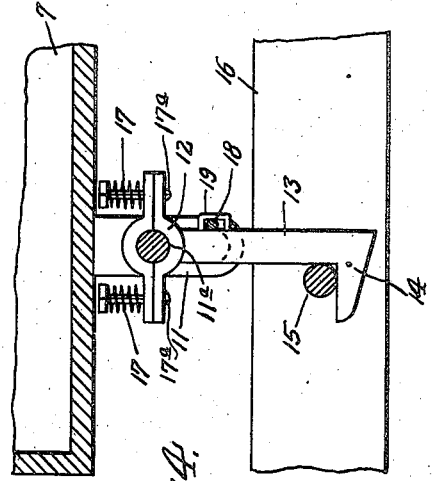
Inventor
*Willie W. Taylor*
By *Clarence A. O'Brien
and Harvey B. Jacobson*
Attorneys Patented Aug. 13, 1946

2,405,721

UNITED STATES PATENT OFFICE 2,405,721

DUMP TRUCK AND LATCH

Willie W. Taylor, Rocky Gap, Va.

Application June 2, 1943, Serial No. 489,410

3 Claims. (Cl. 298—38)

This invention relates to new and useful improvements in dump trucks, and more particularly to a latch means for holding the truck body of a dump truck in positive position.

The principal object of the present invention is to provide latch means for holding a dump truck body against any tendency to vibrate or pivot, thus promoting the life of the truck bed due to the elimination of wear which occurs by the constant knocking against the bed of the truck body, especially when the same is loose or when unbalanced loads are carried.

Other objects and advantages of the invention will become apparent to the reader of the following description.

In the drawings:

Figure 1 is a fragmentary top plan view showing a dump truck body with the improvements installed.

Figure 2 is a fragmentary side elevational view showing the structure represented in Figure 1.

Figure 3 is an enlarged fragmentary detailed sectional view taken substantially on the line 3—3 of Figure 2.

Figure 4 is a sectional view taken substantially on the line 4—4 of Figure 3.

Figure 5 is a fragmentary detailed sectional view taken substantially on the line 5—5 of Figure 3.

Referring to the drawings wherein like numerals designate line parts, it can be seen that numeral 5 generally refers to a conventional truck which includes a truck bed 6 and a dump truck body 7, fulcrumed as at 8.

It is to be observed at the outset that the present invention contemplates a latch means for the forward end of the dump truck which is operative at the same time to a released position as when the act is performed of releasing the usual tail-gate 8a.

In carrying out the present invention, bearings 9 are provided on the bottom of the body 7 and through these bearings 9 is disposed a shaft 10 having a crank 11 with a crank pin 11a at its intermediate portion, this crank being upwardly disposed and carrying a cushioning device consisting of a two-part collar 12 engaging the crank pin 11a, from the lower part of which collar depends a hook 13 having a beveled head 14 for engagement under a cross rod 15 in the chassis 16 of the truck.

Pins 17a slide through openings in the two-part collar 12 and are equipped with springs 17.

A spring rod 18 bridges the space between the crank arms 11 in the middle of the shaft 10 and passes through an eye 19 on the hook 13. Thus the hook 13 is resiliently secured and suspended in position.

A hand bar 20 rises from one end of the shaft 10 and from the intermediate portion of this hand bar 20, a rod 21 extends rearwardly to a bell crank 22 which is provided with a latch head 23 engageable over a keeper 24 on the tail-gate 8a.

It can now be seen that when the hand bar 20 is pushed forwardly, the hook 13 will disengage from the rod 15 at the same time the latch head 23 disengages from the keeper 24 of the tail-gate 8a. Upon reverse movement of the bar 20, the tail-gate will be latched at the same time the latch head 14 of the hook 13 engages under the rod 15. Further, the springs 17 serve to cushion any tendency of the forward end of the truck body 7 to vibrate.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. In combination, a chassis, a truck body fulcrumed on the chassis, a rotatable shaft carried by the bottom of the body at a point remote from the fulcrumed point, a cross member in the chassis, a hook depending from the shaft and being engageable with the cross member, and hand means for actuating the shaft, said shaft being provided with a crank and resilient connecting means between the hook and the crank.

2. In combination, a chassis, a truck body fulcrumed on the chassis, a rotatable shaft carried by the bottom of the body at a point remote from the fulcrumed point, a cross member in the chassis, a hook depending from the shaft and being engageable with the cross member, and hand means for actuating the shaft, said shaft being provided with a crank and resilient connecting means between the hook and comprising a spring member bridging the crank and an eye on said hook through which the spring is disposed, and cushioning means for the truck body carried on said crank.

3. In combination, a chassis, a truck body fulcrumed on the chassis, a rotatable shaft carried by the bottom of the body at a point remote from the fulcrumed point, a cross member in the chassis, a hook depending from the shaft and being engageable with the cross member, and hand means for actuating the shaft, said shaft being provided with a crank and resilient connecting means between the hook and the crank, and a tail-gate latch and a connection between the manual means and the tail-gate latch.

WILLIE W. TAYLOR.